United States Patent
Huang

(10) Patent No.: US 8,975,773 B2
(45) Date of Patent: Mar. 10, 2015

(54) CHARGING SYSTEM FOR ELECTRIC VEHICLE

(71) Applicant: Go-Tech Energy Co., Ltd., New Taipei (TW)

(72) Inventor: Pao-Sheng Huang, New Taipei (TW)

(73) Assignee: Go-Tech Energy Co. Ltd., New Taipei (TW)

( * ) Notice: Subject to any disclaimer, the term of this patent is extended or adjusted under 35 U.S.C. 154(b) by 248 days.

(21) Appl. No.: 13/645,554

(22) Filed: Oct. 5, 2012

(65) Prior Publication Data

US 2014/0097668 A1   Apr. 10, 2014

(51) Int. Cl.
*H02J 7/00* (2006.01)

(52) U.S. Cl.
USPC ............................................ 307/9.1; 320/109

(58) Field of Classification Search
CPC ...... H02J 7/00; H01M 10/46; Y02T 10/7088; Y02T 90/12; Y02T 90/14; Y02T 90/128
See application file for complete search history.

(56) References Cited

U.S. PATENT DOCUMENTS

| | | | | |
|---|---|---|---|---|
| 6,741,065 | B1* | 5/2004 | Ishii et al. | 320/122 |
| 2011/0001354 | A1* | 1/2011 | Lindstrom | 307/9.1 |
| 2011/0169488 | A1* | 7/2011 | Mather | 324/252 |
| 2011/0187184 | A1* | 8/2011 | Ichikawa | 307/10.1 |

FOREIGN PATENT DOCUMENTS

CN  10216477  8/2011

* cited by examiner

*Primary Examiner* — Jared Fureman
*Assistant Examiner* — Terrence Willoughby
(74) *Attorney, Agent, or Firm* — Che-Yang Chen; Law office of Michael Chen

(57) ABSTRACT

A charging system for an electric vehicle is disclosed in the present invention. It includes a rechargeable battery module, a motor driver, a power switch, and a control circuit. The motor driver stops outputting electric power from the rechargeable battery when the control signal from the control circuit is received and keeps outputting electric power from the rechargeable battery when the control signal doesn't exit. The design of the present invention is in a series connection. It can not only be charged simultaneously, but also control the drive motor to stop running. Danger of hard acceleration of the motor due to charge can be avoided.

7 Claims, 6 Drawing Sheets

CHARGING SYSTEM FOR ELECTRIC VEHICLE

FIELD OF THE INVENTION

The present invention relates to a charging system of an electric vehicle. More particularly, the present invention relates to a charging system of an electric vehicle allowing the motor of the electric vehicle to stop running when the battery module is under charging.

BACKGROUND OF THE INVENTION

An electric vehicle, also referred to as an electric drive vehicle, is a moving vehicle using one or more electric motors as driving system. Unlike petroleum-based transportations which are moved by the energy from gasoline, the electric vehicles use electric power as their propulsion. They won't generate waste gas. Noise is also less. A motor is a common equipment to drive an electric vehicle. Due to long time use, the motor needs a huge capacity battery module as a power source. It is better that the battery module is rechargeable.

According to Taiwan E-Scooter (ETS) association and its relevant provisions of the specification from Electronics Testing Center (ETC), Automotive Research & Testing Center (ARTC) and Industrial Technology Research Institute (ITRI) in Taiwan, when a charger is charging a rechargeable battery module of an electric vehicle, the driving motor should cut off from its power source. For the sake of safety, a power cutting-off circuit should be designed in case of hard acceleration of the motor. However, general chargers have no such power management design. Output ports of the chargers are only positive and negative terminals. It is simply designed for charging. At most, there is a communication interface existing in between. Such structures can not meet the requirements mentioned above.

Review of the priors, there are some invention which provide innovative ways to fulfill the requirements. Please refer to FIG. 1. U.S. Pat. No. 8,143,843. The patent disclosed that an electrically-driven hybrid vehicle includes a charging circuit having a charger which is connected to a high-voltage battery and a charge-time connection switch. The switch is connected between the high-voltage battery and the charger, a charger ECU, and a battery ECU. The battery ECU is activated when a voltage signal is inputted, and when determining that the state of the high-voltage battery satisfies a chargeable condition, connects the charge-time connection switch, activates the charger ECU and transmits a signal representing the battery state to the charger ECU. This invention has a good way to monitor and fine tune charging status of the battery ECU. However, it can not decide to stop providing power to a motor when the charger ECU works.

Another related prior is shown in FIG. 2. RO.C. Patent No. 365,142 discloses an electric motor vehicle. It comprises a control terminal, an AC-DC converter module, a battery and a motor. The control terminal can be excited to generate a cut-off signal. The AC-DC converter module has an AC-DC converter and a relay. The AC-DC converter is electrically connected with the battery of the high voltage power supply to the battery and converted to at least one low-voltage power supply, such as 3 volts, 5 volts, or 12 volts for electrical components (for example: headlights, brake lights, headlights, horn, etc.), or electronic components (for example: relay control terminal, etc.) in the electric cars. The relay is electrically connected with the control terminal, the AC-DC converter, the battery and the motor, respectively, to receive the low voltage power from the AC-DC converter, so that the its loops can execute normally switching power conduction. When it is electrically conducted in the loops, high voltage power supply from the battery can be transmitted to the motor via the relay circuit. Therefore, the motor operate. When the relay receives the cut-off signal from the control terminals, the relay can switch its loops to be electronically cut off, so that high voltage power supply from the battery can not be transmitted through the relay circuit to the motor. Thus, the motor stops.

The relay and the AC-DC converter electrically connected to each other. Therefore, the relay can receive the lower voltage from the AC-DC converter, rather than high voltage. The invention has advantages in generating less heat and save power consumption. It is pity that the present invention can not apply to control power for motor when the battery is charged.

According to the explanation above, a charging system of an electric vehicle allowing the motor of the electric vehicle to stop running when the battery module is under charging is still desired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a charging system for an electric vehicle, comprises: a rechargeable battery module, having a plurality of rechargeable batteries connected in series or in parallel, for providing electric power and storing electric power from an external power source; a motor driver, linked to the rechargeable battery module, for controlling output of the electric power from the rechargeable battery module by a control signal; a power switch, connected to the rechargeable battery module and the external power source, for conducting electric power between the rechargeable battery module and the external power source when electric potential in the external power source is higher than that in the rechargeable battery module, and stopping electric power conduction between the rechargeable battery module and the external power source when electric potential in the external power source is lower than that in the rechargeable battery module; and a control circuit, connected with the external power source and the motor driver, for generating the control signal to the motor driver when there is an current from the external power source; wherein the motor driver stops outputting electric power from the rechargeable battery when the control signal is received and keeps outputting electric power from the rechargeable battery when the control signal doesn't exit.

Preferably, the motor driver is linked to a motor or a light.

Preferably, the external power source is an AC/DC converter, a charge controller, a direct current battery, a direct current power or a power factor correction power (PFC) supply.

Preferably, the power switch is passive type or active type.

Preferably, the passive type switch is a diode.

Preferably, the active type switch is a metal-oxide-semiconductor field-effect transistor (MOSFET).

Preferably, the control signal is a current.

DETAILED DESCRIPTION OF THE PREFERRED EMBODIMENT

Figure 1:
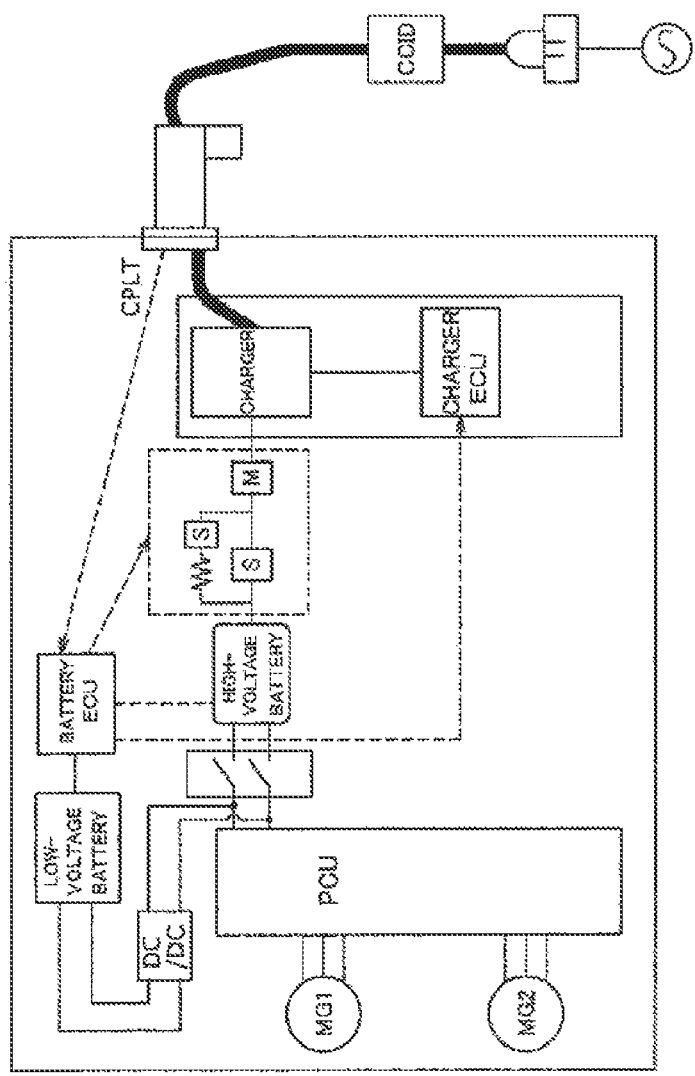
FIG. 1 shows a prior art of a charging system.
Figure 2:
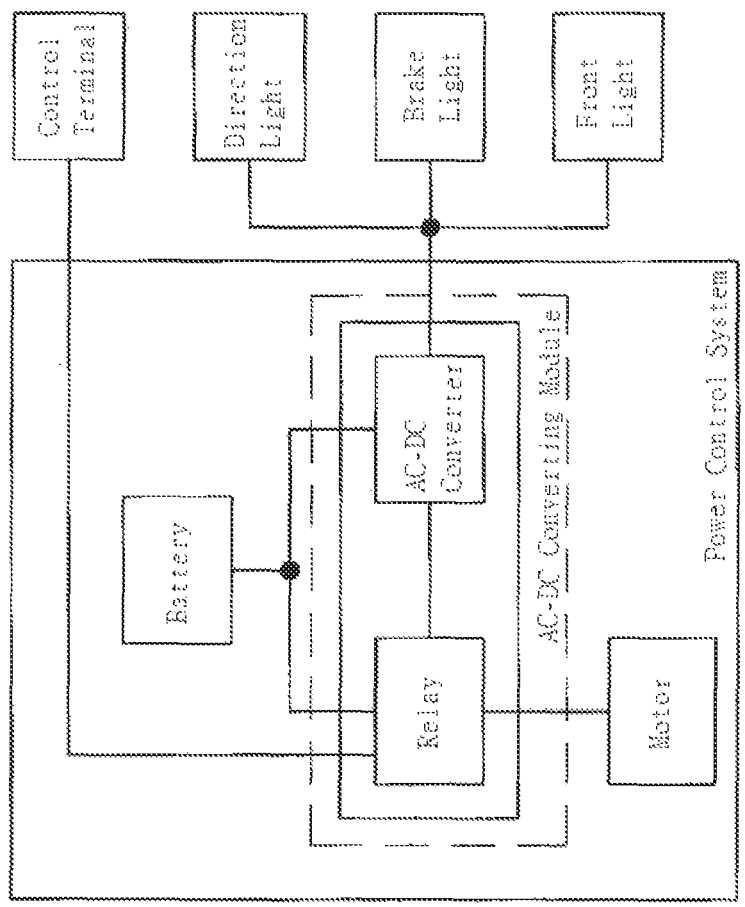
FIG. 2 shows another prior art of a charging system.
Figure 3:
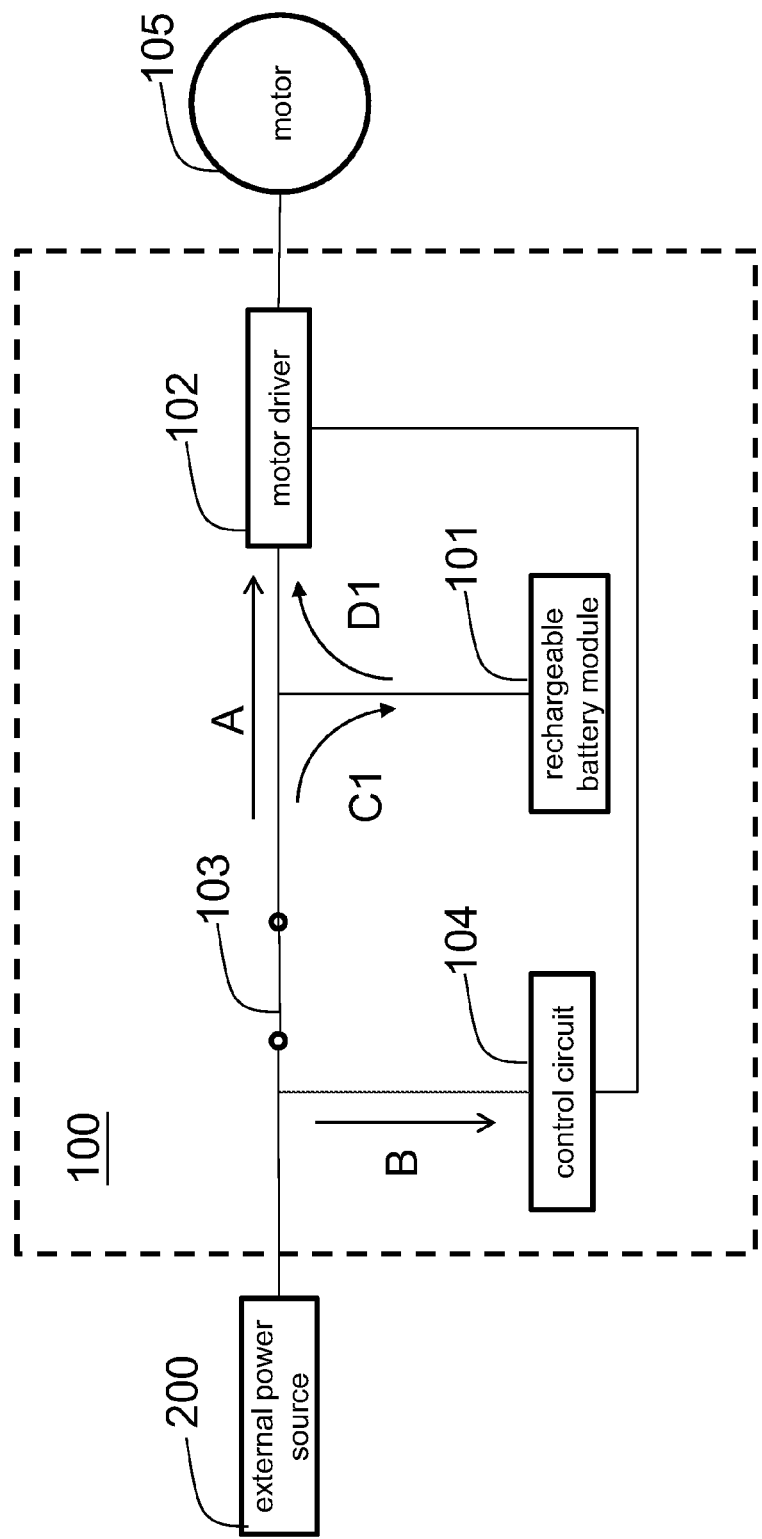
FIG. 3 illustrates an embodiment of the present invention.
Figure 4:
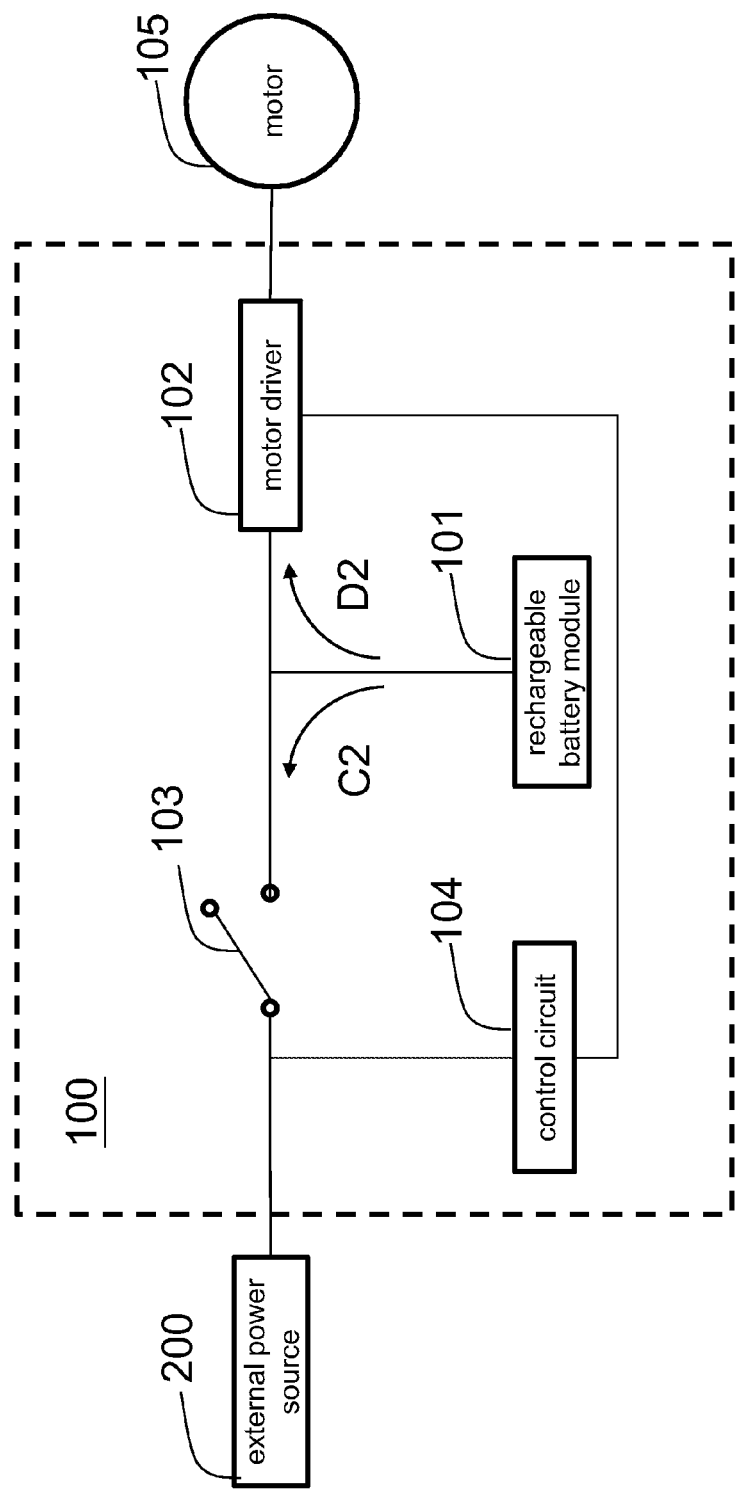
FIG. 4 describes a switch of the embodiment under an open circuit status.
Figure 5:
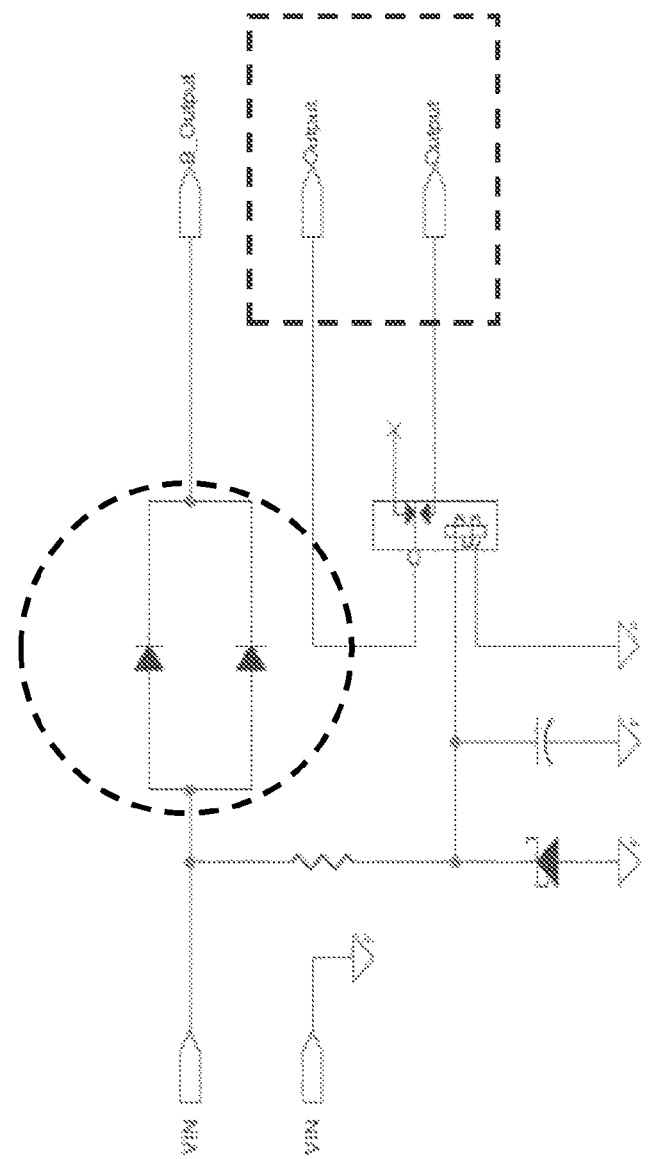
FIG. 5 describes a passive switch and related circuit of the embodiment.
Figure 6:
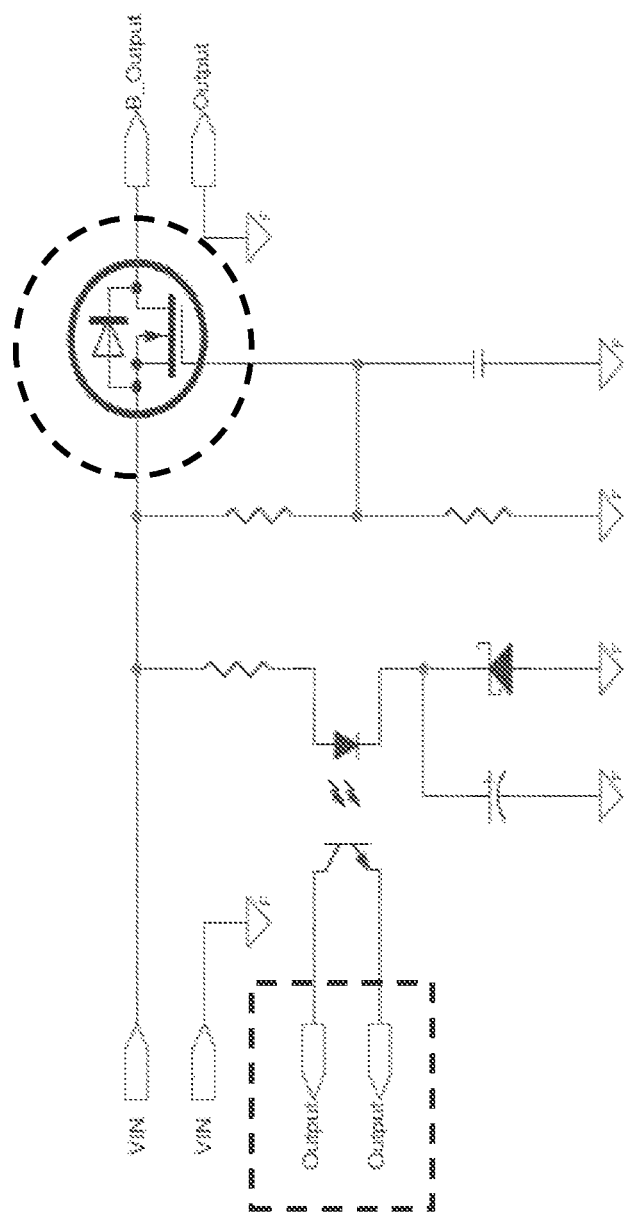
FIG. 6 describes an active switch and related circuit of the embodiment.

The present invention will now be described more specifically with reference to the following embodiment. Please refer to FIG. 3 to FIG. 6. FIG. 3 illustrates a block diagram of the embodiment of the present invention. FIG. 4 describes a switch of the embodiment under an open circuit status. FIG. 5 describes a passive switch and related circuit of the embodiment. FIG. 6 describes an active switch and related circuit of the embodiment.

Please see FIG. 3 first. A charging system 100 for an electric vehicle is in a dashed rectangle. The charging system 100 is composed of a rechargeable battery module 101, a motor driver 102, a power switch 103 and a control circuit 104. The rechargeable battery module 100 have a number of rechargeable batteries connected in series. It is used for providing electric power and storing electric power from an external power source 200. In this embodiment, the external power source 200 is an AC/DC converter which can convert the alternative current from the electricity transmission system to a workable direct current in low voltage. Of course, arrange of rechargeable batteries in the rechargeable battery module 100 is not limited to series connection. Parallel connection or series connection mixed with parallel is also applicable.

The motor driver 102 is linked to the rechargeable battery module 101. It controls output of the electric power from the rechargeable battery module 101 by a control signal. The present invention is used for stop a motor when a charging process is going on. Therefore, the motor driver 102 is further linked to a motor 105. In practice, the application can be available to other device or equipment which needs to stop functions when the electric vehicle is under charging. A good example is light.

The power switch 103 is connected to the rechargeable battery module 101 and the external power source 200. It can conduct electric power between the rechargeable battery module 101 and the external power source 200 if electric potential in the external power source 200 is higher than that in the rechargeable battery module 101. It can also stop electric power conduction between the rechargeable battery module 101 and the external power source 200 when electric potential in the external power source 200 is lower than that in the rechargeable battery module 101.

The control circuit 104 is connected with the external power source 200 and the motor driver 102. It is used for generating the control signal to the motor driver 102 when there is a current sending from the external power source 200. The motor driver 102 stops outputting electric power from the rechargeable battery 101 when the control signal is received and keeps outputting electric power from the rechargeable battery 101 when the control signal doesn't exit.

In order to have a good understanding of the processes how the present invention works, please see FIG. 3 and FIG. 4 at the same time. FIG. 3 shows the power switch 103 is in a short circuit while FIG. 4 shows the power switch 103 is in an open circuit. It is comprehensive to know that when the power switch 103 is in a short circuit, electric power from the external power source 200 can be transmitted to the rechargeable battery 101 for charging via route C1 as long as electric potential in the external power source 200 is higher than that in the rechargeable battery module 101. However, it can also provide power to run the motor 105 by the control circuit 104 via route A. Meanwhile, the rechargeable battery 101 can also provide electric power to the control circuit 104 (indirectly to the motor 105) via route D1. At this moment, the motor 105 won't stop running.

However, the external power source 200 also generates a current to the control circuit 104 via route B due to potential difference. According to the description mentioned above, the control circuit 104 generates the control signal to the motor driver 102 to stop outputting electric power from the rechargeable battery 101. It is obvious that the control signal is another current. Thus, the motor 105 stops working when the external power source 200 charges the rechargeable battery 101. If the electric potential in the external power source 200 is lower than that in the rechargeable battery module 101, the power switch 103 will stop current from the external power source 200. However, the control circuit 104 still will generate the control signal to the motor driver 102 to stop outputting electric power from the rechargeable battery 101 since a current is sent to the control circuit 104 via route B. The motor still stops.

Please refer to FIG. 4. When the external power source 200 doesn't link to the charging system 100 or provides no electric power, the rechargeable battery 101 keeps transmit electric power out via route C2 and D2. Thus, the rechargeable battery 101 can offer power to the motor 105 without block of the motor driver 102.

It should be emphasized that the external power source 200 is not limited to an AC/DC converter. It can be a charge controller, a direct current battery, a direct current power or a power factor correction power (PFC) supply in practice. The power switch 103 has two types, passive type or active type. In order to have a good understanding of this, please refer to FIG. 5 and FIG. 6. FIG. 5 shows that the circuit design utilizes two diodes as the power switch 103 (enclosed by a dashed circle). It is a passive type. VIN refers to electric power from the external power source 200. The control signal is finally sent via Output enclosed by a dashed rectangle. Similarly, FIG. 6 shows that the circuit design utilizes a metal-oxide-semiconductor field-effect transistor (MOSFET) as the power switch 103 (enclosed by a dashed circle). It is an active type. VIN refers to electric power from the external power source 200. The control signal is finally sent via Output enclosed by a dashed rectangle.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A charging system for an electric vehicle, comprising:
   a rechargeable battery module, having a plurality of rechargeable batteries connected in series or in parallel, for providing electric power and storing electric power from an external power source;
   a motor driver, linked to the rechargeable battery module, for controlling output of the electric power from the rechargeable battery module by a control signal;

a power switch, connected to the rechargeable battery module and the external power source, for conducting electric power between the rechargeable battery module and the external power source when electric potential in the external power source is higher than that in the rechargeable battery module, and stopping electric power conduction between the rechargeable battery module and the external power source when electric potential in the external power source is lower than that in the rechargeable battery module; and a control circuit, connected with the external power source and the motor driver, for generating the control signal to the motor driver when there is an current from the external power source;

wherein the motor driver stops outputting electric power from the rechargeable battery when the control signal is received and keeps outputting electric power from the rechargeable battery when the control signal doesn't exist.

2. The charging system according to claim 1, wherein the motor driver is linked to a motor or a light.

3. The charging system according to claim 1, wherein the external power source is an AC/DC converter, a charge controller, a direct current battery, a direct current power or a power factor correction power (PFC) supply.

4. The charging system according to claim 1, wherein the power switch is passive type or active type.

5. The charging system according to claim 4, wherein the passive type switch is a diode.

6. The charging system according to claim 4, wherein the active type switch is a metal-oxide-semiconductor field-effect transistor (MOSFET).

7. The charging system according to claim 1, wherein the control signal is a current.

* * * * *